US009258150B2

(12) United States Patent
Peroulas et al.

(10) Patent No.: US 9,258,150 B2
(45) Date of Patent: Feb. 9, 2016

(54) CHANNEL ESTIMATION FILTERING

(75) Inventors: James Peroulas, University City, MO (US); Patrick Svedman, Stockholm (SE)

(73) Assignee: ZTE Wistron Telecom AB, Stockholm (SE)

(*) Notice: Subject to any disclaimer, the term of this patent is extended or adjusted under 35 U.S.C. 154(b) by 365 days.

(21) Appl. No.: 13/339,341

(22) Filed: Dec. 28, 2011

(65) Prior Publication Data

US 2012/0170630 A1     Jul. 5, 2012

Related U.S. Application Data

(60) Provisional application No. 61/428,222, filed on Dec. 29, 2010.

(51) Int. Cl.
*H04B 3/46*     (2015.01)
*H04B 17/00*     (2015.01)
*H04Q 1/20*     (2006.01)
(Continued)

(52) U.S. Cl.
CPC .......... *H04L 25/0232* (2013.01); *H04L 25/022* (2013.01); *H04L 25/0212* (2013.01); *H04L 27/2647* (2013.01)

(58) Field of Classification Search
CPC .............. H04L 25/0212; H04L 25/022; H04L 25/0232; H04L 27/2647
USPC .......................................... 375/224, 343, 260
See application file for complete search history.

(56) References Cited

U.S. PATENT DOCUMENTS

2007/0110172 A1    5/2007    Faulkner et al.
2008/0137788 A1    6/2008    Bang et al.
(Continued)

FOREIGN PATENT DOCUMENTS

CN          1890935       1/2007
CN         101325568     12/2008

OTHER PUBLICATIONS

Anna Engelbert; Carl Hallqvist; "Digital filters, Computable efficient recursive filters," Master of Science Thesis in Signal Processing, Department of Signal and systems, Chalmers University of Technology, Gothenburg, Sweden, 2008, Report No. EX057/2008.*

(Continued)

*Primary Examiner* — Nader Bolourchi
(74) *Attorney, Agent, or Firm* — Perkins Coie LLP

(57) ABSTRACT

The disclosed methods and systems for improved OFDM channel estimation filtering take advantage of the presence of highly correlated adjacent subcarriers to reduce the computational intensiveness of channel estimation filtering. Specifically, baseband signals corresponding to a channel are received. The cyclic prefixes of the baseband signals are removed, and the resulting signal is transformed into the frequency domain, and compensated by a first time offset of the baseband receive signal. Subcarrier signals used to transmit the baseband signal are then extracted. Adjacent subcarriers having channel responses highly correlated to the subcarriers of the channel are identified, and the signal is compensated by a second time offset that corresponds to a minimal angle of the autocorrelation function of the subcarrier and adjacent subcarriers. The resulting signal is filtered to produce filtered channel estimates, using a filter having a filter length corresponding to the number of highly correlated subcarriers that were identified.

9 Claims, 9 Drawing Sheets

(51) Int. Cl.
  *H04L 25/02* (2006.01)
  *H04L 27/26* (2006.01)

(56) References Cited

U.S. PATENT DOCUMENTS

| | | | |
|---|---|---|---|
| 2009/0252026 A1* | 10/2009 | Yousef | 370/210 |
| 2010/0309958 A1* | 12/2010 | Lakkis | 375/146 |
| 2011/0026619 A1* | 2/2011 | Kent et al. | 375/260 |
| 2011/0051618 A1 | 3/2011 | Li et al. | |
| 2012/0170635 A1 | 7/2012 | Peroulas | |

OTHER PUBLICATIONS

Extended Search Report dated Mar. 30, 2012 from European Patent Application No. 11010290.2, filed on Dec. 29, 2011 (7 pages).

Extended Search Report dated May 8, 2012 from European Patent Application No. 11010291.0, filed on Dec. 29, 2011 (8 pages).

Mehlfuhrer, C., et al., "An Accurate and Low Complex Channel Estimator for OFDM WiMAX," ISCCSP 2008, 3rd International Symposium on Communications, Control and Signal Processing, pp. 922-926, Mar. 12-14, 2008.

Noh, M., et al., "Low complexity LMMSE channel estimation for OFDM," IEE Proceedings Communications, 153 (5):645-650, Oct. 2006.

Office Action dated Mar. 10, 2014 from Chinese Patent Application No. 201110452499.6, filed on Dec. 29, 2011 (6 pages).

Office Action dated Mar. 26, 2014 from Chinese Patent Application No. 201110452962.7, filed on Dec. 29, 2011 (13 pages).

Vigelis, R.F., et al., "A QR Factorization Based Algorithm for Pilot Assisted Channel Estimation in OFDM Systems," ICASSP 2007, IEEE International Conference on Acoustics, Speech and Signal Processing, vol. 3, pp. 305-308, Apr. 15-20, 2007.

Yuanjin, Z., "A Novel Channel Estimation and Tacking Method for Wireless OFDM Systems Based on Pilots and Kalman Filtering," IEEE Transactions on Consumer Electronics, 49(2):275-283, May 2003.

* cited by examiner

CHANNEL ESTIMATION FILTERING

CROSS REFERENCE TO RELATED APPLICATIONS

This patent document claims the benefit of priority of U.S. Provisional Patent Application No. 61/428,222, entitled "OFDM Channel Estimation Filtering", filed on Dec. 29, 2010.

The entire content of the above referenced provisional patent application is incorporated by reference as a part of this patent document.

TECHNICAL FIELD

This patent document relates to devices, systems and methods for communications based on orthogonal frequency division multiplexing (OFDM) or orthogonal frequency division multiple access (OFDMA).

BACKGROUND

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. For a given wireless system, the communication capacity increases as the number of the communication frequency channels increases. Two different frequency channels, when placed too close to each other in frequency, can interfere or cross talk with each other to create noise and thus reduce the signal-to-noise ratio.

One technique to reduce the minimum frequency spacing between two adjacent channels is to generate different channels within a given band by using the orthogonal frequency division multiplexing (OFDM) to generate channel spectral profiles that are orthogonal to one another without interference when different channels are centered at selected equally-spaced frequencies. Under the OFDM, the frequency spacing can be smaller than the minimum spacing in conventional frequency channels and hence increase the number of channels within a given band.

The existing and developing specifications under IEEE 806.16x standards and Long Term Evolution (LTE) standards support wireless communications under OFDM and orthogonal frequency division multiple access (OFDMA). For example, the draft for IEEE 806.16d published in January 2004 provides technical specifications for OFDM and OFDMA wireless systems.

SUMMARY

This document provide devices, systems and methods for communications, including OFDM and OFDMA communication devices, systems and methods that provide improved channel estimation as part of the process of decoding transmitted signals.

In one aspect, a method of wireless communication is disclosed. A plurality of reference signal transmissions is received on a plurality of subcarriers. A plurality of raw channel estimate values is calculated based on the received plurality of reference signals. The plurality of raw channel estimate values is processed to obtain a revised channel estimate.

In another aspect, a system for wireless communication is disclosed. The system includes a receiver for receiving a plurality of reference signal transmissions on a plurality of subcarriers, a raw channel estimator for calculating a plurality of raw channel estimate values based on the received plurality of reference signals and a revised channel estimator for processing the plurality of raw channel estimate values to obtain a revised channel estimate.

In another aspect, a computer program product comprising a non-volatile computer readable medium with computer-executable code stored thereon is disclosed. The computer-executable code, when executed, causes a computer to perform a channel estimation method comprising: receiving a plurality of reference signal transmissions on a plurality of subcarriers, calculating a plurality of raw channel estimate values based on the received plurality of reference signals; and processing the plurality of raw channel estimate values to obtain a revised channel estimate.

In another aspect, a communication system based on orthogonal frequency domain multiplexing (OFDM) includes a network of base stations that are spatially distributed in a service area to form a radio access network for wireless communication devices. Each base station includes an antenna operable to receive a baseband signal having a cyclic prefix, the baseband signal corresponding to a channel, and a processor in communication with the antenna. The processor is configured to receive a baseband signal having a cyclic prefix, the baseband signal corresponding to a channel; remove the cyclic prefix from the baseband signal; transform the baseband signal from a time domain to a frequency domain to yield a baseband signal in the frequency domain; compensate the baseband signal in the frequency domain by a first time offset of the received baseband signal to yield a compensated baseband signal in the frequency domain; extract a subcarrier used to transmit the baseband signal from the compensated baseband signal in the frequency domain to yield a raw channel estimate; determine adjacent subcarriers having channel responses highly correlated to the subcarriers of the channel; compensate the raw channel estimate in the frequency domain by a second time offset to yield a compensated raw channel estimate, where the second time offset corresponds to a minimal angle of the autocorrelation function of the subcarrier and adjacent subcarriers; and filter the compensated raw channel estimate with a filter to yield the filtered channel estimate. The filter length of the filter corresponds to a total of the subcarrier and adjacent subcarriers.

These, and other aspects, are described in greater detail below.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION

In one aspect, the disclosed techniques can be used to improve performance of an OFDM receiver. In another aspect, the disclosed techniques maintain the performance and the operation of an OFDM receive under varying channel noise and signal to noise ratio (SNR) conditions.

OFDM receivers often require channel estimation as part of the process of decoding the signal that was received. To assist the receiver in estimating channel response, often, the transmitter is configured to periodically transmit a known reference signal (sometimes called a pilot signal) on certain subcarriers. By comparing the signal actually received to the signal known to have been transmitted, the receiver can estimate the channel response.

Furthermore, as in a Long Term Evolution (LTE) OFDMA uplink, it is often the case that the reference signal is configured to occupy several adjacent subcarriers. Because the channel response between adjacent subcarriers is typically highly correlated, the channel response from adjacent or nearby subcarriers can be combined and averaged so as to produce improved channel estimates. This technique is sometimes called channel estimate filtering in the frequency domain.

Filtering may be a computationally intensive operation. In some cases, the number of multiplication operations may be reduced by taking advantage of the correlation of adjacent subcarriers of the channel for which estimates are being calculated. As further described below, highly correlated adjacent subcarriers may be identified, and the raw channel estimates in the frequency domain may be compensated by a time offset corresponding to a minimal angle of the autocorrelation function of the channel subcarrier and adjacent subcarriers. The resulting compensated raw channel estimate may be filtered by a filter with a length that corresponds to the number of highly correlated adjacent subcarriers, thus reducing the number of multiplication operations required to produce filtered channel estimates.

Figure 1:
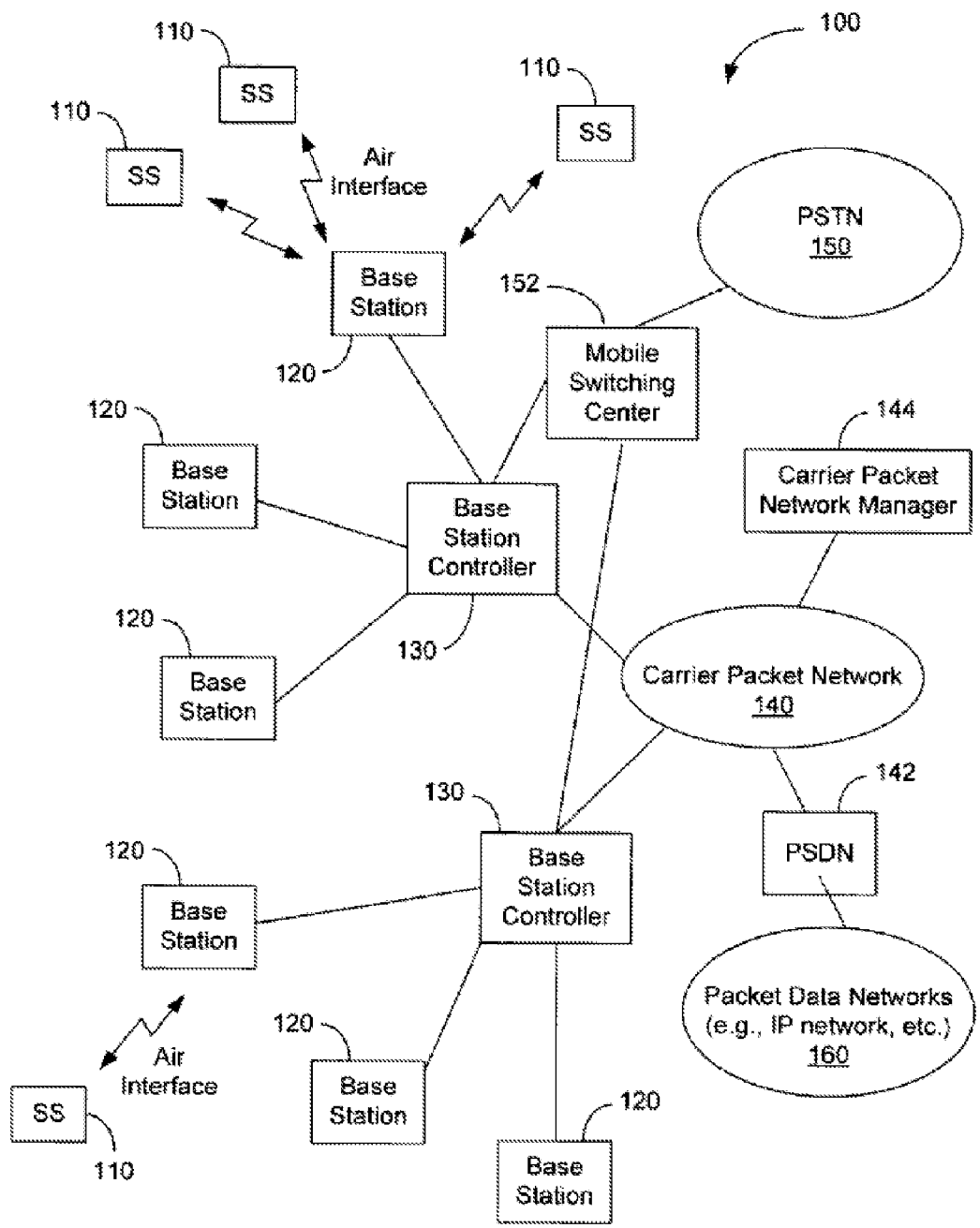
FIG. 1 shows an example of a wireless communication system that may implement an OFDM receiver system in accordance with an embodiment.

FIG. 1 illustrates an exemplary wireless communication system 100 that uses communication channels at different frequencies under OFDM or OFDMA to provide wireless communication services based in accordance with an embodiment. The system 100 may include a network of base stations (BSs) or base station transceivers (BSTs) 120 that are spatially distributed in a service area to form a radio access network for wireless subscribers or wireless subscriber stations (SSs) 110. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected to one or more public switched telephone networks (PSTN) 150 and one or more packet data networks 160 (e.g., an IP network). A mobile switching center (MSC) 152 may be used as an interface between the BSCs 130 and the PSTN 150. A packet data serving node 142 may be used to provide an interface between the carrier packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscriber station 110 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscriber station 110 may be any communication device capable of wirelessly communicating with base stations 120.

In one embodiment, the system in FIG. 1 may be applied to the communication bands from 2 to 11 GHz under OFDM and OFDMA provided in IEEE 802.16x standards such as IEEE 802.16d (January, 2004). In OFDM and OFDMA systems, the available frequency band is divided into subcarriers at different frequencies that are orthogonal. In an OFDMA system, a subchannel is formed from a subset of subcarriers. In OFDMA, a total of 32 sub channels are allocated to each radio cell.

A base station (BSs) or base station transceiver (BSTs) 120 may include an OFDM receiver. OFDM receivers often require channel estimation as part of the process of decoding the signal that was transmitted. To assist the receiver in calculating the response of the channel, often, the transmitter is configured to periodically transmit a known reference signal (also known as a pilot signal) on certain subcarriers. By comparing the signal actually received to the signal known to have been transmitted, the receiver can estimate the response of the channel.

Furthermore, as in an LTE OFDMA uplink, it is often the case that the reference signal is configured to occupy several adjacent subcarriers. Because the channel response between adjacent subcarriers is highly correlated, the channel response from adjacent or nearby subcarriers can be combined and averaged so as to produce improved channel estimates.

Figure 2:
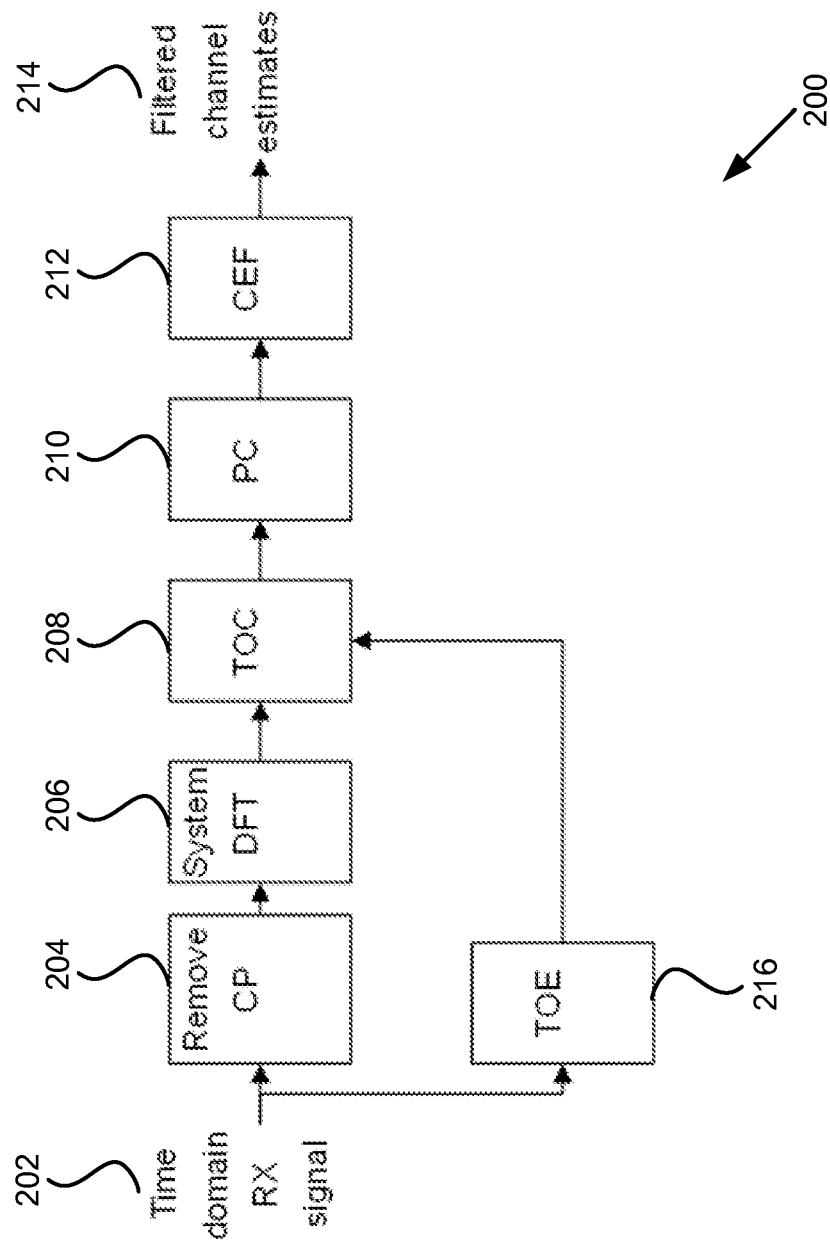
FIG. 2 is a diagram illustrating an exemplary OFDM receiver system.

FIG. 2 shows a schematic diagram of an OFDM receiver which performs channel estimate filtering in the frequency domain. The exemplary processing shown in system 200 to generate filtered channel estimates may be performed using any combination of hardware and software suitable to implement the required functionality disclosed herein. In one embodiment, the hardware may include a digital signal processor, such as a TMS320TCI6616 wireless base station system-on-a-chip from Texas Instruments Incorporated of Dallas, Tex. The digital signal processor may be configured with processor executable instructions. The processor executable instructions may be stored in random access memory (RAM) within or in communication with the digital signal processor, or non-volatile memory within or in communication with the digital signal processor, such as a read-only memory (ROM), EEPROM (Electrically Erasable and Programmable Read Only Memory), or E-flash (embedded flash). The executable instructions that configure the digital signal processor may implement a number of software modules or applications that communicate with one another and with hardware and software inside and outside of base station, in order to implement the functions of an OFDM receiver 200.

The received baseband signal 202 is sent into a module 204 which removes the cyclic prefix (CP) from the OFDM symbol. The output of this module 204 is sent into the system DFT module 206 which transforms the signal from the time domain to the frequency domain.

In order to filter channel estimates in the frequency domain, a fundamental requirement of an OFDM receiver is that it must perform time offset estimation (TOE) as indicated by the TOE module 216 in FIG. 2. Several TOE algorithms are available in the literature. One example TOE algorithm operates in the time domain and performs time domain correlations of the actual received signal against the time domain signal known to have been transmitted. The location of the peak of this time domain correlation is taken to be the time offset of the received signal.

Time offset compensation (TOC) 208 is performed after the system DFT 206 based on the time offset estimated by the TOE module 216. Let the vector D of length $N_{DFT}$ represent the output of the system DFT where $N_{DFT}$ is the size of the system DFT.

Furthermore, let D(i) (the i'th element of vector D) represent the $$e^{j\frac{2\pi i}{N_{DFT}}}$$

frequency component of the received time domain n signal.

Note that in this document, all vectors are assumed to be column vectors unless stated otherwise. Furthermore, indices into vectors or matrices start at the value 0. Therefore, for the D(i) vector described above, i takes on values 0 through $N_{DFT}-1$ inclusive.

If $T_1$ is the vector representing the output of the TOC module 208, then:

$$T_1(i) = D(i)e^{j\frac{2\pi i}{N_{DFT}}t_d}, 0 \leq i \leq N_{DFT} - 1. \quad \text{Eq 1}$$

where $t_d$ represents the delay to be compensated. $t_d$ is, in general, a floating point number but is scaled such that if $t_d$ is 1, this indicates that the time offset was estimated as one sample, sampled at the sampling rate of the signal going into the system DFT 206.

After the time offset has been compensated, the signal goes into a pilot compensation (PC) module 210 which extracts the subcarriers that were used to transmit the reference sequence and also compensates for the known reference signal that was transmitted. Let $H_{raw}$ represent the complex-valued vector coming out of the pilot compensation module.

$$H_{raw}(i) = \frac{T_1(i+P_1)}{P(i)}, 0 \leq i \leq N_{REF} - 1. \quad \text{Eq 2}$$

$N_{REF}$ is the number of subcarriers that are occupied by reference symbols. $P_1$ is the location of the first reference symbol in the output of the system DFT. P is a length $N_{REF}$ vector that contains the known reference symbols that were sent from the transmitter (it is assumed that no reference symbol has the value 0). For example, suppose it is known that the transmitter has transmitted 35 reference symbols (vector P) on subcarriers 123 through 157. In this case, $P_1$ would be 123 and $N_{REF}$ would be 35.

Put simply, $H_{raw}$ is a vector containing the raw channel estimates. In an ideal system containing no noise, $H_{raw}$ would perfectly represent the channel response between the transmitter and the receiver ($H_{actual}$) since then $T_1(i+P_1)=H_{actual}(i)P(i)$. However, in a real world system, noise corrupts the channel estimates.

The channel estimate filter (CEF) 212 module attempts to take advantage of the known a-priori auto-correlation properties of the channel response so as to produce refined channel estimates with improved accuracy.

Let $H_{actual}$ represent the actual frequency domain channel response from the transmitter to the receiver, here seen as a complex-valued random column vector. Furthermore, let $R_H$ represent the autocorrelation matrix of this channel as:

$$R_H = \frac{E[H_{actual}H_{actual}^H]}{\sigma_s^2} \quad \text{Eq 3}$$

where E[ ] is the expectation operator, the H superscript represents the Hermitian transpose operation, and $\sigma_s^2$ is the average received power of the channel.

Note that $H_{actual}$ includes both the effects of the radio channel and of the receiver blocks up to the CEF block 212. Therefore, $R_H$ can be different for different TOE and TOC algorithms.

In estimation theory, a linear system model is written as:

$$x_e = H_e\theta_e + w_e \quad \text{Eq 4}$$

where the $\theta_e$ column-vector is the parameter to be estimated, $H_e$ is the observation matrix through which the parameter is observed, $w_e$ is the noise column-vector that corrupts the estimates, and the $x_e$ column-vector contains the actual observations.

For the linear system model in Eq 4, the linear minimum mean squared error estimator (LMMSE) is given by:

$$\hat{\theta}_e = \mu_{\theta_e} + (C_{\theta_e}^{-1} + H_e^H C_{w_e}^{-1} H_e)^{-1} H_e^H C_{w_e}^{-1}(x_e - H_e\mu_{\theta_e}) \quad \text{Eq 5}$$

where $C_X$ is the covariance matrix of vector X (i.e., $C_X = E[XX^H]$).

Applied to the present problem, the parameter to be estimated, $\theta_e$, is $H_{actual}$. It is being observed through an identity matrix ($H_e = I$) and is being corrupted by a white Gaussian receiver noise vector N (i.e., $w_e = N$). The noise vector's autocovariance matrix) ($C_{w_e}$) is $\sigma_n^2 I$ where $\sigma_n^2$ is the average power of the noise introduced by the receiver. The linear system model of the problem at hand is thus given by $$H_{raw} = IH_{actual} + N \quad \text{Eq 6}$$

Since the channel estimates can be assumed to have zero mean, one has $\mu_{\theta_e} = 0$. Assigning: $\hat{\theta}_e = H_{filt}$, $C_{\theta_e} = \sigma_s^2 R_H$, and $x_e = H_{raw}$, one has the well known result:

$$H_{filt} = \left(\frac{R_H^{-1}}{\sigma_s^2} + \frac{I}{\sigma_n^2}\right)^{-1} \frac{H_{raw}}{\sigma_n^2} \quad \text{Eq 7}$$

$$H_{filt} = M_{smooth} H_{raw} \quad \text{Eq 8}$$

Therefore, if the raw channel estimates ($H_{raw}$) are multiplied by the $N_{REF} \times N_{REF}$ matrix $M_{smooth}$, the result will be a smoothened and filtered set of channel estimates $H_{filt}$ 214 which will have better noise properties than the original raw channel estimates. Actually, $H_{filt}$ will have the lowest mean squared error among all linear estimators.

One issue is that applying the $M_{smooth}$ matrix to the raw channel estimates is very costly. For each filtered channel estimate, $N_{REF}$ complex multiplications are required.

Figure 3:
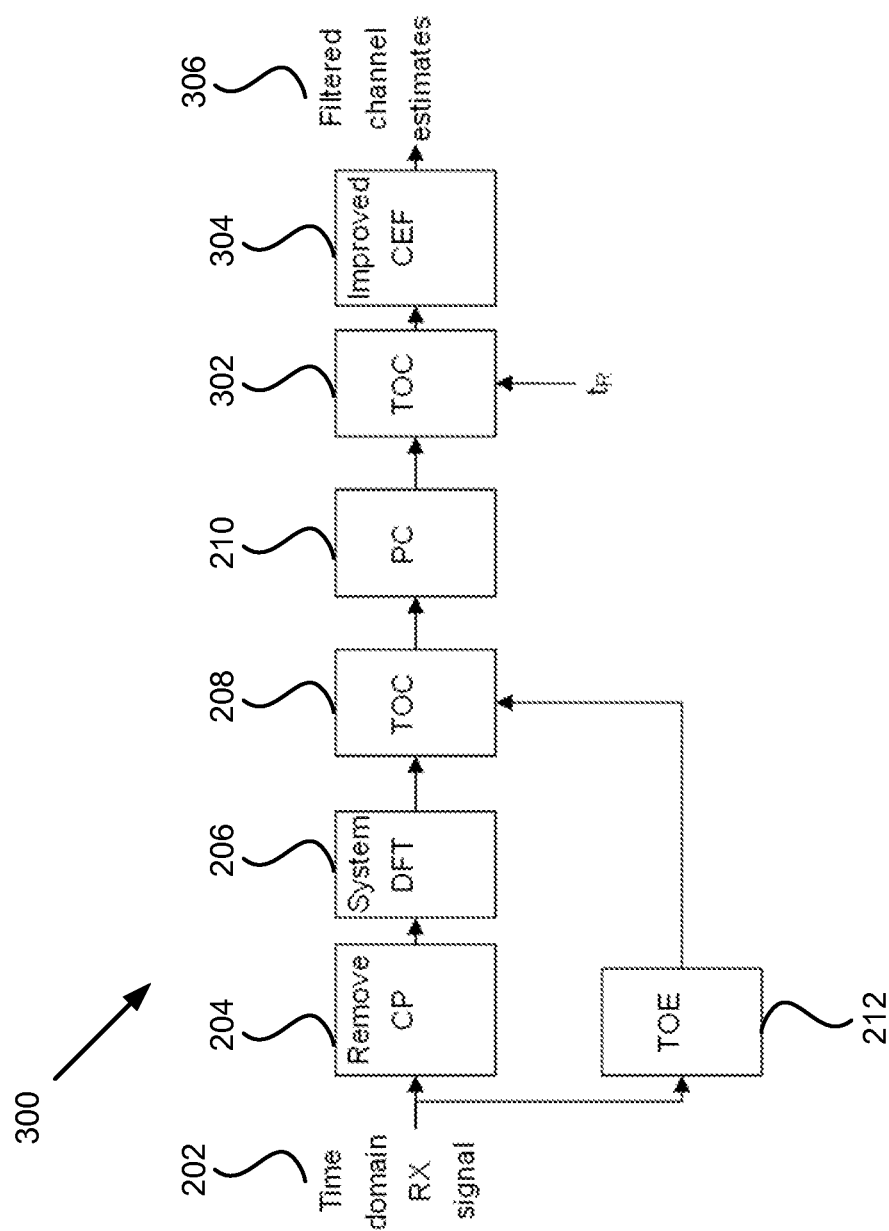
FIG. 3 is a diagram illustrating an exemplary OFDM receiver system in accordance with an embodiment.

FIG. 3 is a diagram illustrating an exemplary OFDM receiver system in accordance with an embodiment. The received baseband signal 202 is sent into a module 204 which removes the cyclic prefix (CP) from the OFDM symbol. The output of this module 204 is sent into the system DFT 206 which transforms the signal from the time domain to the frequency domain.

The received baseband signal is also processed by the time offset estimation (TOE) module as indicated by the TOE module 212 in FIG. 3. Several TOE algorithms are available in the literature. One example TOE algorithm operates in the time domain and performs time domain correlations of the actual received signal against the time domain signal known to have been transmitted. The location of the peak of this time domain correlation is taken to be the time offset of the received signal.

Time offset compensation (TOC) 208 is performed after the system DFT 206 based on the time offset estimated by the TOE module. Let the vector D of length $N_{DFT}$ represent the output of the system DFT where $N_{DFT}$ is the size of the system DFT. Furthermore, let D(i) (the i'th element of vector D) represent the $$e^{j\frac{2\pi i}{N_{DFT}}}$$

frequency component of the received time domain signal. Note that i takes on values 0 through $N_{FT}-1$ inclusive.

If $T_1$ is the vector representing the output of the TOC module 208, then:

$$T_1(i) = D(i)e^{j\frac{2\pi i}{N_{DFT}}t_d}, 0 \le i \le N_{DFT} - 1 \quad \text{Eq 9}$$

where $t_d$ represents the delay to be compensated. $t_d$ is, in general, a floating point number but is scaled such that if $t_d$ is 1, this indicates that the time offset was estimated as one sample, sampled at the sampling rate of the signal going into the system DFT.

After the time offset has been compensated, the signal goes into a pilot compensation (PC) module 210 which extracts the subcarriers that were used to transmit the reference sequence and also compensates for the known reference signal that was transmitted. Let Hraw represent the vector coming out of the pilot compensation module 210.

$$H_{raw}(i) = \frac{T_1(i+P_1)}{P(i)}, 0 \le i \le N_{REF} - 1 \quad \text{Eq 10}$$

$N_{REF}$ is the number of subcarriers that are occupied by reference symbols. $P_1$ is the location of the first reference symbol in the output of the system DFT. P is a length $N_{REF}$ vector that contains the known reference symbols that were sent from the transmitter (it is assumed that no reference symbol is 0). For example, suppose it is known that the transmitter has transmitted 35 reference symbols (vector P) on subcarriers 123 through 157. In this case, $P_1$ would be 123 and $N_{REF}$ would be 35.

Put simply, $H_{raw}$ is a vector containing the raw channel estimates. In an ideal system containing no noise, $H_{raw}$ would perfectly represent the channel response between the transmitter and the receiver ($H_{actual}$). However, in a real world system, noise corrupts the channel estimates.

It should be noted that for simplicity reasons, the discussion in this document assumes that $E[H_{raw}]$ is zero. It should be straightforward to one skilled in the art to generalize the equations presented in this document to the non-zero mean case.

At this point, the autocorrelation function of the raw channel estimates r is:

$$r_{H_{raw}}(t) = \frac{E[H_{raw}(n)H_{raw}^*(n-t)]}{\sigma_s^2} \quad \text{Eq 11}$$

Figure 4:
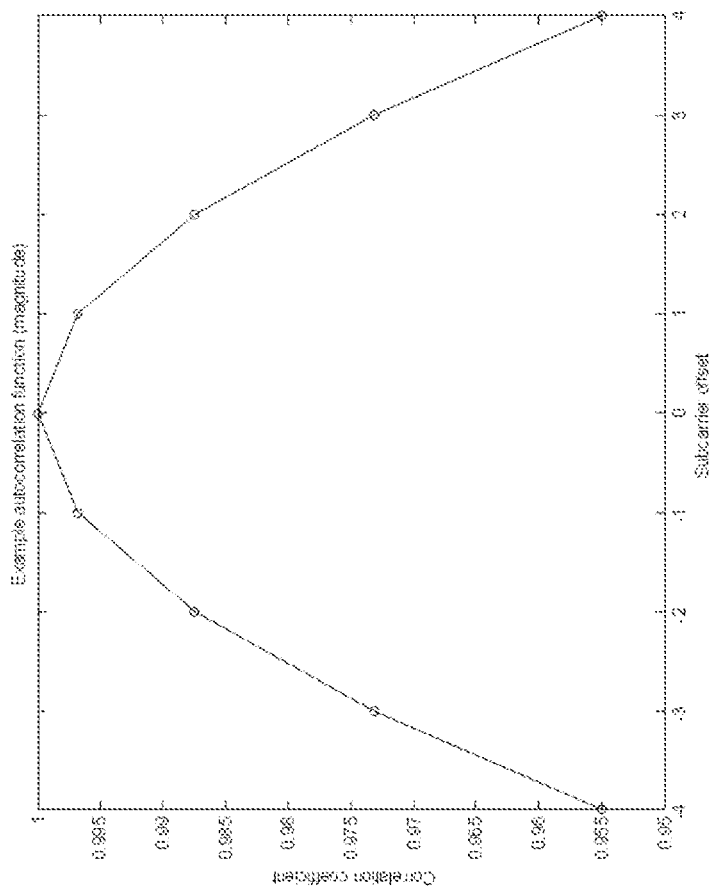
FIG. 4 is a graph illustrating exemplary autocorrelation function for a radio channel.
Figure 4:
Figure 5:
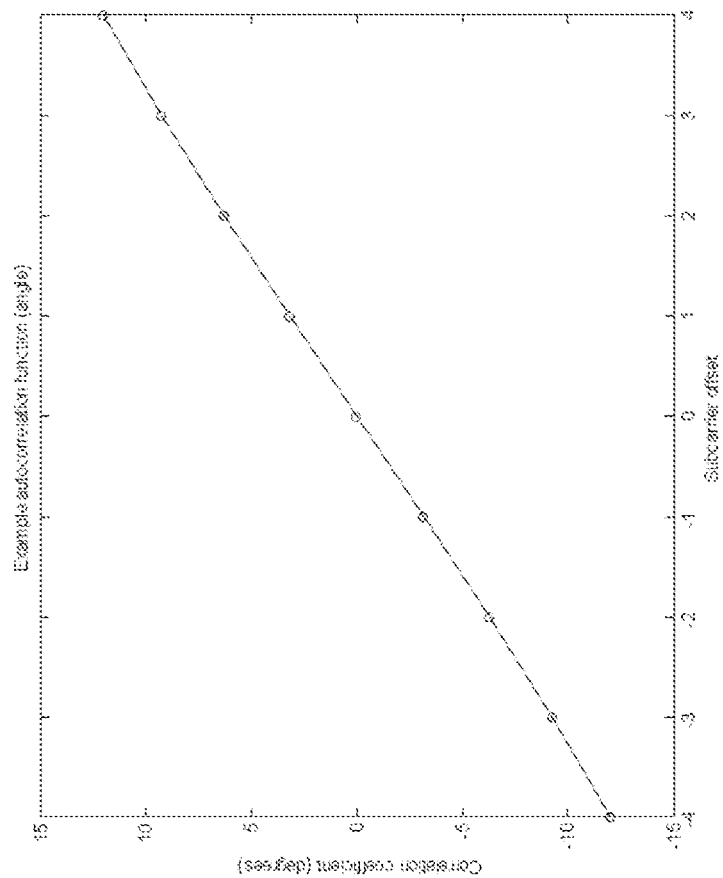
FIG. 5 is a graph illustrating exemplary autocorrelation function for a radio channel.

An example autocorrelation function $r_{H_{raw}}$ for a typical radio channel is shown in FIG. 4 (graph 400) and FIG. 5 (graph 500). FIG. 4 demonstrates the magnitude of the correlation function and one can see that, for this particular channel, subcarriers adjacent to a particular subcarrier have a very high correlation coefficient (about 0.997). FIG. 5, on the other hand, demonstrates the angle of the same example autocorrelation function where one sees that in this particular case, the angle is nearly, but not completely linear. In general, it is not necessarily the case that the autocorrelation function is near-linear.

This system 300 operates by taking advantage of the fact that the channel responses for adjacent subcarriers are highly correlated in many different types of propagation channels. The number of adjacent samples which can be considered 'highly correlated' will vary based on the statistical properties of the channel and the performance required from the receiver. For example, in critical implementations where receiver performance is paramount, it may not be reasonable to assume that adjacent carriers are highly correlated and hence one must implement a costly receiver that does not attempt to take advantage of high correlations among adjacent subcarriers. However, in some receiver designs, a tradeoff is possible where some performance loss can be accepted considering that the performance loss brings with it a significant savings in terms of implementation cost. The exact tradeoff between implementation cost and performance may be decided on a case by case basis.

In one embodiment, the number of subcarriers which are considered to be highly correlated is represented by the variable B. For example, if B is 3, then this embodiment assumes that the 3 subcarriers before a particular subcarrier, the subcarrier itself, and the 3 subcarriers after a particular subcarrier are highly correlated. In total, 2B+1 subcarriers are considered to be highly correlated. Although the actual value of B will vary from receiver to receiver and from channel to channel, in one embodiment, B is expected to typically be very small between 1 and 5.

A variety of methods may be used to determine the appropriate value of B. For example, link level simulations may be performed to quantify the performance lost for various values of B. Another estimation of the implementation savings may also be performed for various values of B. In one embodiment, the value of B selected has a small impact on performance but a large impact on implementation cost.

It is difficult to provide a precise definition of how one can determine how many subcarriers are 'highly correlated'. Instead, the techniques described in the paragraph above can be used to tradeoff the B value between performance an implementation cost.

In order to fully take advantage of the high degree of correlation among nearby subcarriers, the system 300 introduces a second TOC module 302 in the receive chain which may flatten the phase response of the autocorrelation function. In one embodiment, no matter what the value of the $t_R$ parameter of the second TOC module, the magnitude of the autocorrelation function of the signal coming out of the second TOC module will be the same as the magnitude of the autocorrelation function of the signal coming out of the PC module. The phase, however, will be affected.

The signal coming out of the second TOC module ($T_2$) 302 is:

$$H'_{raw}(i) = H_{raw}(i) e^{j\frac{2\pi i}{N_{DFT}} t_R}, \ 0 \leq i \leq N_{REF} - 1 \qquad \text{Eq 12}$$

One can define the autocorrelation function of the output of the second TOC module 302:

$$r_{H'_{raw}}(t) = \frac{E[H'_{raw}(n) H'^{*}_{raw}(n-t)]}{\sigma_s^2} \qquad \text{Eq 13}$$

where $t_R$ may be chosen such that the angle of the autocorrelation function of $H'_{raw}$ ($r_{H'_{raw}}$) will be near zero for subcarrier offsets between −B and +B. If the angle of $r_{H_{raw}}$ was in fact a straight line, it would be possible to choose a $t_R$ value that would cause the angle of $r_{H'_{raw}}$ to be precisely 0 for subcarrier offsets between −B and +B. However, in general, the angle of $r_{H_{raw}}$ will seldom be a straight line and hence the angle of $r_{H'_{raw}}$ will seldom be exactly equal to zero.

One simple strategy is to ignore all points of $r_{H_{raw}}$ except for $r_{H_{raw}}(-B)$ and $r_{H_{raw}}(B)$. $t_R$ can then be assigned as:

$$t_R = \frac{N_{DFT}}{2\pi} \frac{\angle r_{H_{raw}}(-B) - \angle r_{H_{raw}}(B)}{2B} \qquad \text{Eq 14}$$

where the $\angle$ operator returns the angle of its argument as measured in radians.

Alternatively, one can only use $r_{H_{raw}}(-1)$ and $r_{H_{raw}}(1)$ regardless of the value of B:

$$t_R = \frac{N_{DFT}}{2\pi} \frac{\angle r_{H_{raw}}(-1) - \angle r_{H_{raw}}(1)}{2} \qquad \text{Eq 15}$$

The autocorrelation function of the output of the second TOC module 302, $r_{H'_{raw}}$, has the same magnitude as $r_{H_{raw}}$, but has a phase which is closer to 0 in the range −B to +B. Specifically:

$$r_{H'_{raw}}(t) = r_{H_{raw}}(t) e^{j\frac{2\pi t}{N_{DFT}} t_R} \qquad \text{Eq 16}$$

The output of the second TOC module 302 is sent into the improved channel estimate filter (improved CEF) module 304.

The first step that may be taken in the improved CEF module 304 is that a filter, such as a simple all-ones filter, is applied to the input data so as to reduce the amount of data that needs to be processed. This filter can be represented as a matrix operation:

$$H_D = Q H'_{raw} \qquad \text{Eq 17}$$

In one embodiment, the Q matrix in the CEF module 304 is constructed by first creating a $N_{REF} \times N_{REF}$ matrix where all the entries are zero except for the main diagonal and the 2*B diagonals above the main diagonal which will all have the value 1. In total, 2*B+1 diagonals contain the value 1 and all other diagonals contain the value 0. From this matrix one retains the row 1, row B+1, row 2*B+1, row 3*B+1, and so on until, at most, row $N_{REF} - 2*B$. For example, if $N_{REF}$ is 9 and B is 2:

$$Q = \begin{bmatrix} 1 & 1 & 1 & 1 & 1 & 0 & 0 & 0 & 0 \\ 0 & 0 & 1 & 1 & 1 & 1 & 1 & 0 & 0 \\ 0 & 0 & 0 & 0 & 1 & 1 & 1 & 1 & 1 \end{bmatrix} \qquad \text{Eq 18}$$

In all cases, each row of Q contains exactly 2*B+1 ones and the remaining values are 0. Other similar or equivalent Q matrix values or arrangements are possible.

Note that multiplying the $H'_{raw}$ vector by the Q matrix is a very low cost operation since only additions are involved.

In estimation theory, a linear system model is written as:

$$x_e = H_e \theta_e + w_e \qquad \text{Eq 19}$$

where the $\theta_e$ column-vector is the parameter to be estimated, $H_e$ is the observation matrix through which the parameter is observed, $w_e$ is the noise column-vector that corrupts the estimates, and the $x_e$ column-vector contains the actual observations.

For the linear system model in Eq 19, the linear minimum mean squared error estimator (LMMSE) is given by:

$$\hat{\theta}_e = \mu_{\theta_e} + (C_{\theta_e}^{-1} + H_e^H C_{w_e}^{-1} H_e)^{-1} H_e^H C_{w_e}^{-1} (x_e - H_e \mu_{\theta_e}) \qquad \text{Eq 20}$$

where $C_X$ is the covariance matrix of vector X (i.e., $C_X = E[XX^H]$).

Applied to the present problem, the system equation is:

$$H_{filt} = QH_{actual} + QN \qquad \text{Eq 21}$$

The parameter to be estimated, $\theta_e$, is $H_{actual}$. It is being observed through the Q matrix ($H_e = Q$) and is being corrupted by a noise vector QN (i.e., $w_e = QN$). The noise vector's autocovariance matrix ($C_{w_e}$) is $\sigma_n^2 QQ^H$ where $v_n^2$ is the average power of the noise introduced by the receiver.

Assigning: $\hat{\theta}_e = H_{filt}$, $\mu_{\theta_e} = 0$, $C_{\theta_e} = \sigma_s^2 R_H$, and $x_e = H_D$, one has:

$$H_{filt} = \left( \frac{R_H^{-1}}{\sigma_s^2} + \frac{Q^H (QQ^H)^{-1} Q}{\sigma_n^2} \right)^{-1} \frac{Q^H (QQ^H)^{-1}}{\sigma_n^2} H_D \qquad \text{Eq 22}$$

$$H_{filt} = M'_{smooth} H_D \qquad \text{Eq 23}$$

$$H_{filt} = M'_{smooth} Q H'_{raw} \qquad \text{Eq 24}$$

Based on $H_D$, the above equation optimally estimates $H_{actual}$ among all linear estimators. Instead of filtering $H'_{raw}$ directly which contains $N_{ref}$ samples, $H_D$ is filtered and it contains approximately $N_{REF}/B$ samples which is already approximately a factor of B reduction in implementation cost.

Further improvements can be made to the implementation cost of the channel estimation filter 304 by recognizing that the $M'_{smooth}$ matrix simultaneously averages the $H_D$ samples and also performs interpolation among them so as to produce a total of $N_{REF}$ estimates. Because the subcarrier channel responses are highly correlated, further improvements are possible by separating the averaging operation from the interpolation operation.

A Q' matrix can be created which will be applied to the $M'_{smooth}$ matrix so as to reduce the number of calculations that need to be performed. This matrix is created by examining the Q matrix row by row. For every row, the Q matrix contains an odd number of consecutive 1's. The other elements are zero. The Q' matrix is created by keeping the middle-most 1 from every row and setting all other values to zero. For example, the previous Q matrix shown in Eq 18 is transformed into the Q' matrix as:

$$Q' = \begin{bmatrix} 0 & 0 & 1 & 0 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \end{bmatrix} \quad \text{Eq 25}$$

The final form of the channel estimate filtering equation is:

$$H_{filt} = X((Q'M'_{smooth})(QH'_{raw})) \quad \text{Eq 26}$$

where X is an interpolation matrix. Other similar or equivalent matrix values or arrangements for Q', Q, and X may also achieve improvements in implementation cost.

The parenthesis in the above equation serve to indicate how the implementation of the channel estimation filter 304 is expected to proceed so as to minimize the implementation cost. First, the Q matrix is applied to $H'_{raw}$. This is a simple operation simply requiring several additions to be performed. $QH'_{raw}$ will be a vector containing approximately $N_{REF}/B$ elements whereas $H'_{raw}$ contains $N_{REF}$ elements.

Next, $M'_{smooth}$ will be calculated based on the received signal power and the received noise power. This will produce a matrix with $N_{REF}$ rows and approximately $N_{REF}/B$ columns. Applying the Q' matrix to this matrix will simply remove some rows of $M'_{smooth}$ and produce a final square matrix where each side is approximately of size $(N_{REF}/B) \times (N_{REF}/B)$.

The $Q'M'_{smooth}$ matrix is then applied to the vector $QH'_{raw}$. This produces a vector of approximately $N_{REF}/B$ samples. These samples can be interpreted to be smoothed channel estimates for subcarriers $B+1$, $2*B+1$, $3*B+1$, and so on. The interpolation matrix X will then interpolate these estimates and produce the final estimates 306 for every subcarrier from 1 through $N_{REF}$.

Figure 6:
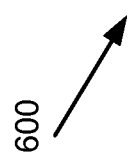
FIG. 6 is a graph illustrating exemplary linear interpolation function implemented by an interpolation matrix multiplication operation.
Figure 6:
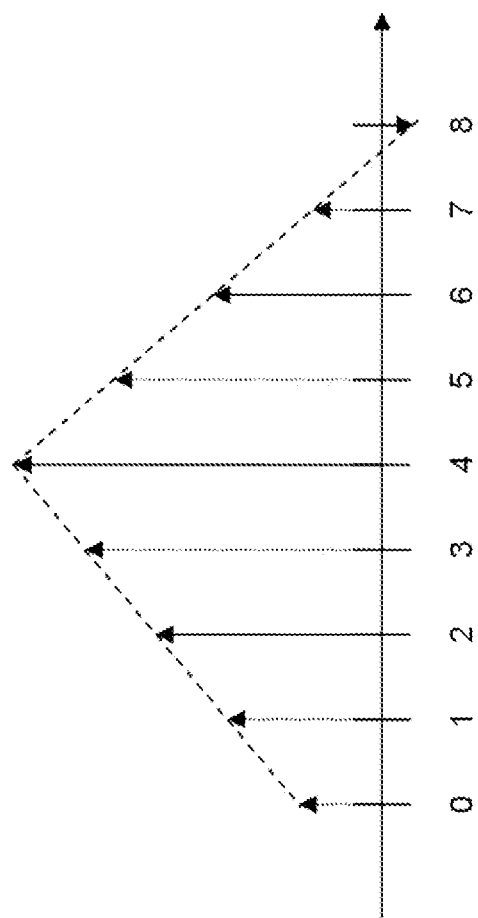

Several possible interpolation matrices are available. The simplest interpolation matrix performs linear interpolation based on the nearest two available smoothed channel estimates. A graphical example 600 of the operation of the interpolation matrix is shown in FIG. 6. The three solid vertical arrows (subcarriers 2, 4, and 6) in FIG. 6 represent the estimates produced by applying the $Q'M'_{smooth}$ matrix to the vector $QH'_{raw}$. These samples are used unmodified. The remaining samples are created by linear interpolation among the available subcarriers. For example, subcarrier 3 is created by averaging subcarriers 2 and 4. Subcarriers 0 and 1 are created by visualizing a line connecting the estimates for subcarrier 2 and 4 (indicated by a dashed line in FIG. 6) and calculating the value of that line for subcarriers 0 and 1. Subcarriers 5, 7, and 8 are similarly created based on a line connecting the channel estimates for subcarriers 4 and 6.

For example, if $N_{REF}$ is 9 and B is 2, the interpolation matrix X would be:

$$X = \begin{bmatrix} 2 & -1 & 0 \\ 1.5 & -0.5 & 0 \\ 1 & 0 & 0 \\ .5 & .5 & 0 \\ 0 & 1 & 0 \\ 0 & .5 & .5 \\ 0 & 0 & 1 \\ 0 & -0.5 & 1.5 \\ 0 & -1 & 2 \end{bmatrix} \quad \text{Eq 27}$$

Other interpolation matrices are available. Linear interpolation using two samples may be the best matrix to use in many cases because of the ease of its implementation. Specifically, at most, two real valued multiplications per filtered channel estimate are required with linear interpolation.

The advantage of the embodiments can be seen by comparing Eq 26 to a filtering equation that does not take advantage of the high correlation between adjacent subcarriers.

$$H_{filt} = X((Q'M'_{smooth})(QH'_{raw})). \quad \text{Eq 28}$$

$$H_{filt} = M_{smooth} H_{raw} \quad \text{Eq 29}$$

Applying the Q matrix to $H'_{raw}$ in Eq 26 is a low cost operation which only involves the use of adders. Furthermore, applying the X matrix in Eq 26 is also a low cost operation involving only two simple multiplications per filtered channel estimate. Note that when the interpolation factors are as simple as in Eq 27, the multiplications can often be implemented as shift and add operations.

A comparison is made between the application of $M_{smooth}$ to $H_{raw}$ in Eq 29 and the application of $Q'M'_{smooth}$ to $QH'_{raw}$ in Eq 26. $M_{smooth}$ is an $N_{REF} \times N_{REF}$ matrix which requires $N_{REF}^2$ complex multiplications to be applied to $H_{raw}$. $Q'M'_{smooth}$ is approximately of size $(N_{REF}/B) \times (N_{REF}/B)$ and hence requires approximately $$\frac{N_{REF}^2}{B^2}$$

complex multiplications to apply to $QH'_{raw}$. Clearly, even if B is only 2, there is a significant reduction in implementation cost in the embodiments over other implementations.

Further implementation reductions are possible when one recognizes that typically, the $Q'M'_{smooth}$ matrix is maximal along its main diagonal and as one gets further and further from the main diagonal, the coefficients in this matrix typically decrease rather quickly. Instead of using the full $Q'M'_{smooth}$ matrix, one can instead use a simplified matrix $M_{simp}$ which has a form similar to the following equation:

$$M_{simp} = \begin{bmatrix} c_{0,0} & c_{0,1} & c_{0,2} & c_{0,3} & c_{0,4} & 0 & 0 & 0 & 0 & 0 & 0 & 0 \\ c_{1,0} & c_{1,1} & c_{1,2} & c_{1,3} & c_{1,4} & 0 & 0 & 0 & 0 & 0 & 0 & 0 \\ c_{2,0} & c_{2,1} & c_{2,2} & c_{2,3} & c_{2,4} & 0 & 0 & 0 & 0 & 0 & 0 & 0 \\ 0 & c_{3,0} & c_{3,1} & c_{3,2} & c_{3,3} & c_{3,4} & 0 & 0 & 0 & 0 & 0 & 0 \\ 0 & 0 & c_{4,0} & c_{4,1} & c_{4,2} & c_{4,3} & c_{4,4} & 0 & 0 & 0 & 0 & 0 \\ 0 & 0 & 0 & c_{5,0} & c_{5,1} & c_{5,2} & c_{5,3} & c_{5,4} & 0 & 0 & 0 & 0 \\ 0 & 0 & 0 & 0 & c_{6,0} & c_{6,1} & c_{6,2} & c_{6,3} & c_{6,4} & 0 & 0 & 0 \\ 0 & 0 & 0 & 0 & 0 & c_{7,0} & c_{7,1} & c_{7,2} & c_{7,3} & c_{7,4} & 0 & 0 \\ 0 & 0 & 0 & 0 & 0 & 0 & c_{8,0} & c_{8,1} & c_{8,2} & c_{8,3} & c_{8,4} & 0 \\ 0 & 0 & 0 & 0 & 0 & 0 & 0 & c_{9,0} & c_{9,1} & c_{9,2} & c_{9,3} & c_{9,4} \\ 0 & 0 & 0 & 0 & 0 & 0 & 0 & c_{10,0} & c_{10,1} & c_{10,2} & c_{10,3} & c_{10,4} \\ 0 & 0 & 0 & 0 & 0 & 0 & 0 & c_{11,0} & c_{11,1} & c_{11,2} & c_{11,3} & c_{11,4} \end{bmatrix} \quad \text{Eq 30}$$

The size of square matrix $Q'M'_{smooth}$ is the same as the size of square matrix $M_{simp}$. Let W to represent the size of one of the dimensions of $Q'M'_{smooth}$. Furthermore, let L represent the number of non-zero coefficients per row of $M_{simp}$.

If L is odd, the leftmost L entries of the upper (L+1)/2 rows and the rightmost L entries of the lower (L+1)/2 rows will contain coefficients. For rows (L+1)/2 through W−(L+1)/2−1, the coefficient locations of any particular row will be located in the same positions as the non-zero entries of the previous row, but shifted to the right by one position.

If L is even, the leftmost L entries of the upper L/2 rows and the rightmost L entries of the lower L/2+1 rows will contain coefficients. For rows L/2 through W−L/2−2, the coefficient locations of any particular row will be located in the same positions as the non-zero entries of the previous row, but shifted to the right by one position.

The optimal coefficients for $M_{simp}$ can be solved by calculating $Q'M'_{smooth}$ as if $N_{ref}$ was equal to $L*(B+1)+B$. Let the $Q'M'_{smooth}$ matrix calculated under the assumption that $N_{ref}=L*(B+1)+B$ be called $M_{ref}$. This matrix is of size L×L and let $d_{a,b}$ represent the coefficient in row a, column b of $M_{ref}$. To assign the coefficients to the $M_{simp}$ example matrix shown above, one will use the following assignments:

$$c_{a,b} = d_{a,b} \quad 0 \le a \le 1 \quad 0 \le b \le 4 \qquad \text{Eq 31}$$

$$c_{a,b} = d_{2,b} \quad 2 \le a \le 9 \quad 0 \le b \le 4 \qquad \text{Eq 32}$$

$$c_{a,b} = d_{a-7,b} \quad 10 \le a \le 11 \quad 0 \le b \le 4 \qquad \text{Eq 33}$$

Therefore, for odd L, the upper (L+1)/2 rows of $M_{ref}$ are assigned to the upper (L+1)/2 rows of $M_{simp}$ and the lower (L+1)/2 rows of $M_{ref}$ are assigned to the lower (L+1)/2 rows of $M_{simp}$. The intermediate rows are all assigned the coefficients of row (L+1)/2−1 of $M_{ref}$. For even L, the upper L/2 rows of $M_{ref}$ are assigned to the upper L/2 rows of $M_{simp}$ and the lower L/2 rows of $M_{ref}$ are assigned to the lower L/2 rows of $M_{simp}$. The intermediate rows are all assigned the coefficients of row L/2−1 of $M_{ref}$.

This extra reduction further reduces the number of multiplications that are necessary. Whereas applying the $Q'M'_{smooth}$ matrix to $QH'_{raw}$ required about $$\frac{N_{REF}^2}{B^2}$$

complex multiplications, applying $M_{simp}$ to $QH'_{raw}$ requires about $L*N_{ref}/B$ multiplications.

The actual value chosen for L will depend on simulations which tradeoff the performance that may be lost by using a small L value against the simplified implementation cost.

It should be clear to those skilled in the art that several modifications to the embodiments are possibly without deviating in substance from the embodiments. For example, whereas the exemplary embodiments contained two TOC modules, it should be clear to one skilled in the art that the TOC and PC modules in system 300 can be freely interchanged and performed in any order. Furthermore, performing a TOC operation with parameter a followed by a TOC operation with parameter b is the same as performing a TOC operation with parameter a+b. In the exemplary embodiments, the TOC operations were separated so as to simplify the narrative explanation of the embodiments. A real world implementation may simply perform a single TOC operation by combining the two TOC operations described in the embodiments.

Furthermore, although the TOE module 212 was located at the input to the system 300, it should be clear to those skilled in the art that different TOE algorithms are available and that some of them operate by examining the output of the system DFT 206 so as to determine the time offset.

Figures 7, 8:
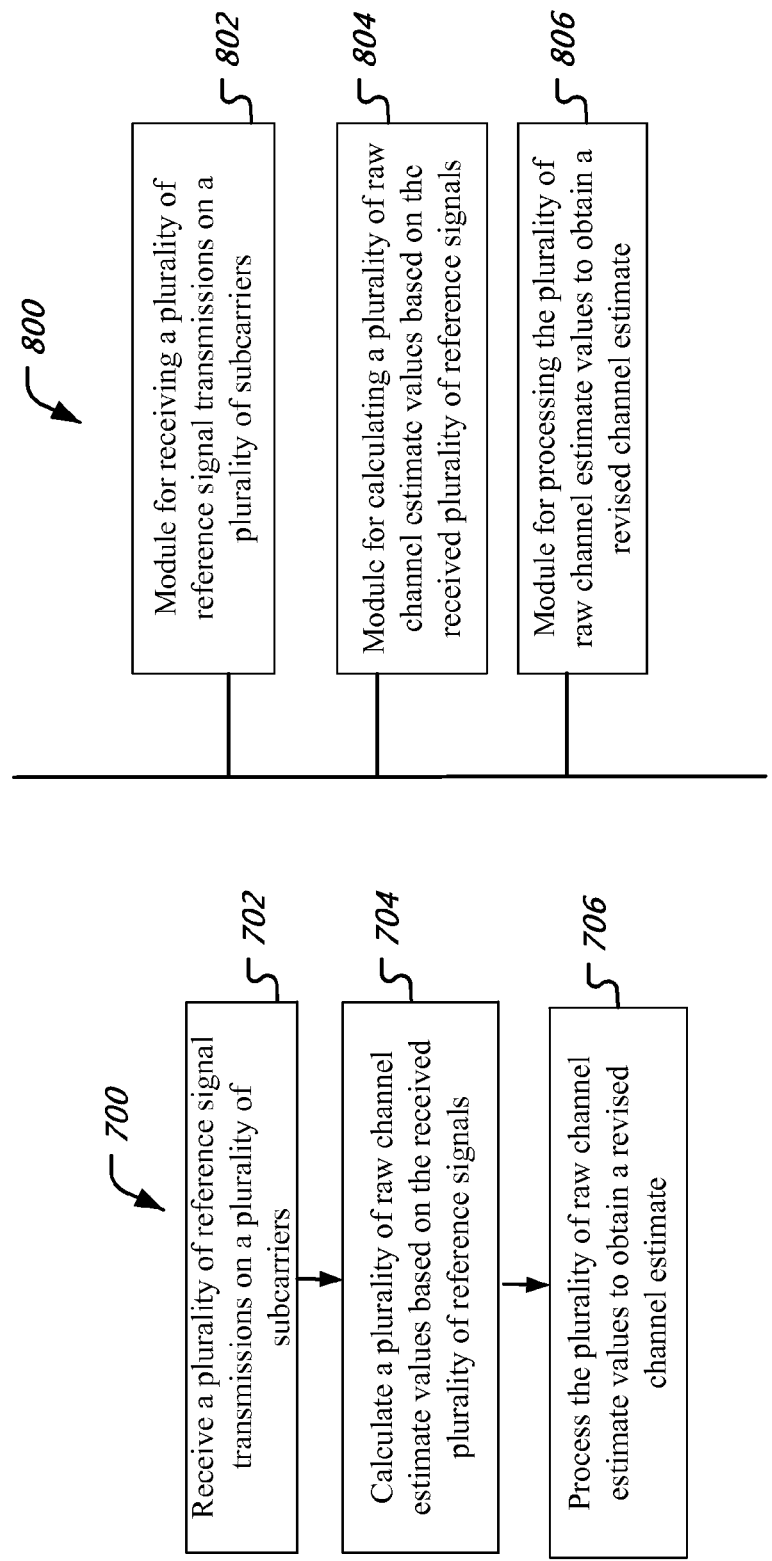
FIG. 7 is a flow chart representation of a process of wireless communications.
FIG. 8 is a block diagram representation of a portion of a wireless communications device.

FIG. 7 is a flow chart representation of a process 700 of wireless communications. At 702, a plurality of reference signal transmissions are received on a plurality of subcarriers. The subcarriers that carry reference signals may, e.g., be contiguous or apart from each other and may be known a priori to a receiver. At 704, a plurality of raw channel estimate values may be calculated based on the received plurality of reference signals. The calculations may, e.g., include calculating Hraw, as previously described. At 706, the plurality of raw channel estimates may be processed to obtain a revised channel estimate. In some implementations, the processing may include filtering the raw channel estimates using a linear filter (e.g., represented as a matrix multiplication in the discussion above). The processing may also including interpolating the plurality of raw channel estimate values using an interpolation filter (e.g., averaging), as previously described. In some implementations, the processing may depend on the received signal power and received noise power, as previously discussed. In some implementations, the revised channel estimate may be obtained by processing 2*B+1 subcarrier results, where B is an integer.

FIG. 8 is a block diagram representation of a portion of a wireless communications apparatus 800. The module 802 (e.g., a receiver) is for receiving a plurality of reference signal transmissions on a plurality of subcarriers. The module 804 (e.g., a raw channel estimator) is for calculating a plurality of raw channel estimate values based on the received plurality of reference signals. The module 806 (e.g., a revised channel estimator) is for processing the plurality of raw channel estimate values to obtain a revised channel estimate. The apparatus 800 and modules 802, 804, 806 may further be configured to implement one or more of the techniques described in this patent document.

Figure 9:
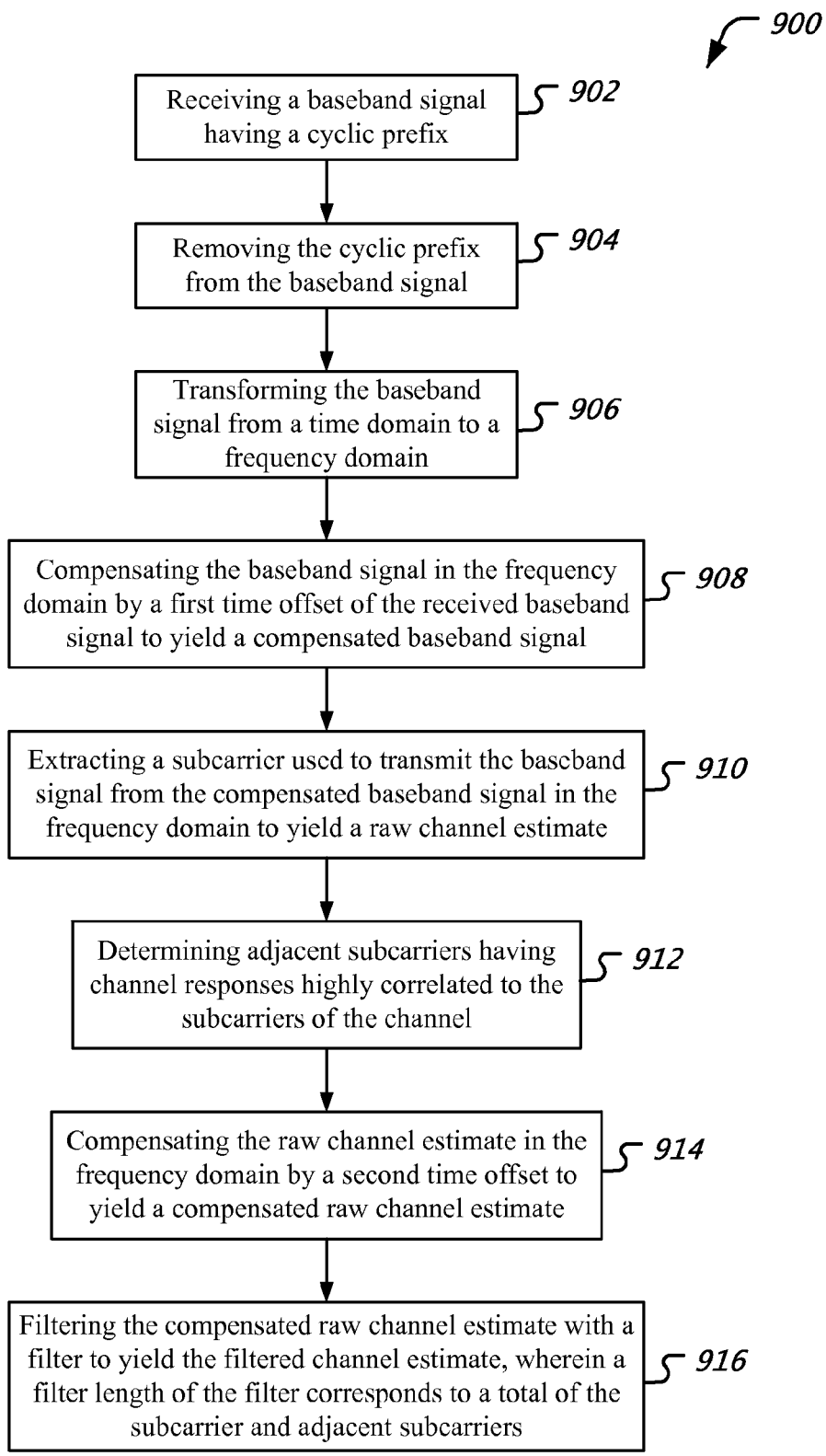
FIG. 9 is a flow chart representation of a method of obtaining a channel estimate in a receiver.

FIG. 9 is a flow chart representation of a method 900 of obtaining a channel estimate in a receiver. At 902, a baseband signal having a cyclic prefix is received, wherein the baseband signal corresponds to a channel. At 904, the cyclic prefix is removed from the baseband signal. At 906, the baseband signal is transformed from a time domain to a frequency domain to yield a baseband signal in the frequency domain. At 908, the baseband signal in the frequency domain is compensated by a first time offset of the received baseband signal to yield a compensated baseband signal in the frequency domain. At 910, a subcarrier used to transmit the baseband signal is extracted from the compensated baseband signal in the frequency domain to yield a raw channel estimate. At 912, adjacent subcarriers having channel responses highly correlated to the subcarriers of the channel are determined. At 914, the raw channel estimate in the frequency domain is compensated by a second time offset to yield a compensated raw channel estimate, where the second time offset corresponds to a minimal angle of the autocorrelation function of the subcarrier and adjacent subcarriers. At 916, the compensated raw channel estimate is filtered with a filter to yield the filtered channel estimate, wherein a filter length of the filter corresponds to a total of the subcarrier and adjacent subcarriers.

Figure 10:
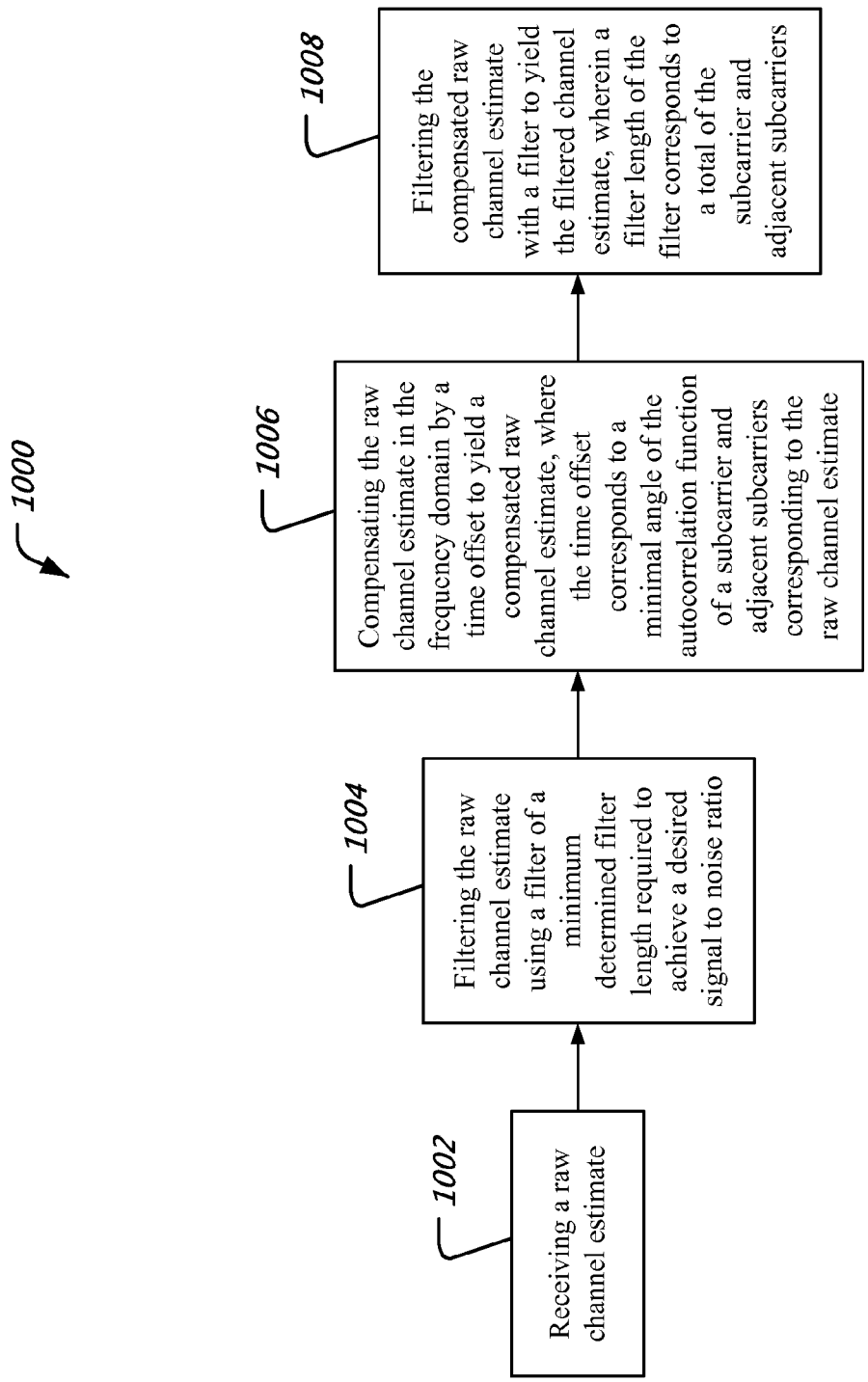
FIG. 10 is a flow chart representation of a method of obtaining a filtered channel estimate in a receiver.

FIG. 10 is a flow chart representation of a method 1000 of obtaining a filtered channel estimate in a receiver. At 1002, a raw channel estimate is received. At 1004, the raw channel estimate is filtered using a filter of a minimum determined filter length required to achieve a desired signal to noise ratio. At 1006, the raw channel estimate in the frequency domain is compensated by a time offset to yield a compensated raw channel estimate, where the time offset corresponds to a minimal angle of the autocorrelation function of a subcarrier and adjacent subcarriers corresponding to the raw channel estimate. At 1008, the compensated raw channel estimate is filtered with a filter to yield the filtered channel estimate, wherein a filter length of the filter corresponds to a total of the subcarrier and adjacent subcarriers.

It will be appreciated that several techniques have been disclosed to perform channel estimation in an orthogonal frequency domain multiplexing (OFDM) reception operation. In one aspect, multiple raw channel estimates obtained on neighboring subcarriers are filtered to obtain a revised channel estimate, to help improve the receiver performance. In another aspect, the raw channel estimates may be filtered through a smoothing filter, which may be represented as a matrix multiplication operations, with the number of multiplications of the matrix being less than the length of the channel estimate.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of obtaining a channel estimate in a receiver, comprising:
   receiving a baseband signal having a cyclic prefix, the baseband signal corresponding to a channel;
   removing the cyclic prefix from the baseband signal;
   transforming the baseband signal from a time domain to a frequency domain to yield a baseband signal in the frequency domain;
   compensating the baseband signal in the frequency domain by a first time offset of the received baseband signal to yield a compensated baseband signal in the frequency domain;
   extracting a subcarrier used to transmit the baseband signal from the compensated baseband signal in the frequency domain to yield a raw channel estimate;
   determining adjacent subcarriers having channel responses highly correlated to that of the subcarrier;
   compensating the raw channel estimate in the frequency domain by a second time offset to yield a compensated raw channel estimate, where the second time offset corresponds to a minimal angle of the autocorrelation function of the subcarrier and the adjacent subcarriers; and
   filtering the compensated raw channel estimate with a filter to yield the filtered channel estimate, wherein a filter length of the filter corresponds to a total number of the subcarrier and the adjacent subcarriers;
   wherein the filtering operation comprises:
   filtering, in frequency domain, the compensated raw channel estimate using a linear filter; and
   interpolating the compensated raw channel estimate using an interpolation filter.

2. The method of claim 1, wherein the interpolation filter implements linear interpolation.

3. The method of claim 1, wherein the filtering operation is based on received signal power and received noise power.

4. A method of obtaining a filtered channel estimate in a receiver, comprising:
   receiving a raw channel estimate;
   filtering the raw channel estimate using a filter of a minimum determined filter length required to achieve a desired signal to noise ratio,
   compensating the raw channel estimate in the frequency domain by a time offset to yield a compensated raw channel estimate, where the time offset corresponds to a minimal angle of the autocorrelation function of a subcarrier and adjacent subcarriers corresponding to the raw channel estimate; and
   filtering the compensated raw channel estimate with a filter to yield the filtered channel estimate, wherein a filter length of the filter corresponds to a total of the subcarrier and the adjacent subcarriers corresponding to the raw channel estimate;
   wherein the filtering the compensated raw channel estimate operation comprises:
   filtering, in frequency domain, the compensated raw channel estimate using a linear filter; and
   interpolating the compensated raw channel estimate using an interpolation filter.

5. The method of claim 4, wherein the filtering the compensated raw channel estimate operation is based on received signal power and received noise power.

6. A receiver, comprising:
   an antenna operable to receive a baseband signal having a cyclic prefix, the baseband signal corresponding to a channel; and
   a processor in communication with the antenna, the processor operable to:
   receive a baseband signal having a cyclic prefix, the baseband signal corresponding to a channel;
   remove the cyclic prefix from the baseband signal;
   transform the baseband signal from a time domain to a frequency domain to yield a baseband signal in the frequency domain;
   compensate the baseband signal in the frequency domain by a first time offset of the received baseband signal to yield a compensated baseband signal in the frequency domain;
   extract a subcarrier used to transmit the baseband signal from the compensated baseband signal in the frequency domain to yield a raw channel estimate;
   determine adjacent subcarriers having channel responses highly correlated to that of the subcarrier;
   compensate the raw channel estimate in the frequency domain by a second time offset to yield a compensated raw channel estimate, where the second time offset corresponds to a minimal angle of the autocorrelation function of the subcarrier and adjacent subcarriers; and
   filter the compensated raw channel estimate with a filter to yield the filtered channel estimate, wherein a filter length of the filter corresponds to a total number of the subcarrier and adjacent subcarriers;
   wherein the processor filtering the compensated raw channel estimate operation comprises:
   filtering, in frequency domain, the compensated raw channel estimate using a linear filter; and
   interpolating the compensated raw channel estimate using an interpolation filter.

7. The receiver of claim 6, wherein the processor filtering the compensated raw channel estimate operation is based on received signal power and received noise power.

8. A communication system based on orthogonal frequency domain multiplexing (OFDM) comprising:
   a network of base stations that are spatially distributed in a service area to form a radio access network for wireless communication devices,
   wherein each base station includes an antenna operable to receive a baseband signal having a cyclic prefix, the baseband signal corresponding to a channel, and a processor in communication with the antenna, and
   wherein the processor is configured to
   receive a baseband signal having a cyclic prefix, the baseband signal corresponding to a channel;
   remove the cyclic prefix from the baseband signal;
   transform the baseband signal from a time domain to a frequency domain to yield a baseband signal in the frequency domain;

compensate the baseband signal in the frequency domain by a first time offset of the received baseband signal to yield a compensated baseband signal in the frequency domain;

extract a subcarrier used to transmit the baseband signal from the compensated baseband signal in the frequency domain to yield a raw channel estimate;

determine adjacent subcarriers having channel responses highly correlated to that of the subcarrier;

compensate the raw channel estimate in the frequency domain by a second time offset to yield a compensated raw channel estimate, where the second time offset corresponds to a minimal angle of the autocorrelation function of the subcarrier and adjacent subcarriers; and filter the compensated raw channel estimate with a filter to yield the filtered channel estimate, wherein a filter length of the filter corresponds to a total number of the subcarrier and adjacent subcarriers;

wherein the processor filtering the compensated raw channel estimate operation comprises:

filtering, in frequency domain, the compensated raw channel estimate using a linear filter; and interpolating the compensated raw channel estimate using an interpolation filter.

9. The communication system of claim 8, wherein the processor filtering the compensated raw channel estimate operation is based on received signal power and received noise power.

* * * * *